(12) United States Patent
Palmer

(10) Patent No.: US 6,705,647 B1
(45) Date of Patent: Mar. 16, 2004

(54) FLUID COUPLING DEVICE

(75) Inventor: Robert Palmer, Hopatcong, NJ (US)

(73) Assignee: Strahman Valves, Inc., Florham Park, NJ (US)

( * ) Notice: Subject to any disclaimer, the term of this patent is extended or adjusted under 35 U.S.C. 154(b) by 27 days.

(21) Appl. No.: 09/718,273

(22) Filed: Nov. 22, 2000

(51) Int. Cl.[7] ............................................. F16L 27/04
(52) U.S. Cl. ..................... 285/261; 285/271; 285/351
(58) Field of Search ........................ 285/146.1, 261, 285/270, 271, 266, 351

(56) References Cited

U.S. PATENT DOCUMENTS

| | | | |
|---|---|---|---|
| 1,087,006 A | | 2/1914 | Fitzsimons |
| 1,347,470 A | * | 7/1920 | Bard ........................... 285/271 |
| 1,568,649 A | * | 1/1926 | Woodruff ..................... 285/266 |
| RE20,488 E | | 8/1937 | Zinkil |
| 2,421,691 A | * | 6/1947 | Gibson, Jr. et al. .......... 285/266 |
| 2,557,106 A | | 6/1951 | Hughes |
| 2,971,701 A | | 2/1961 | Shames et al. |
| 3,022,014 A | | 2/1962 | Young |
| 3,224,793 A | | 12/1965 | Benjamin |
| 3,334,818 A | | 8/1967 | Moen |
| 3,454,288 A | * | 7/1969 | Mancusi, Jr. ............. 285/261 X |
| 3,663,043 A | * | 5/1972 | Walton .................... 285/261 X |
| 3,921,912 A | | 11/1975 | Hayes |
| 3,951,418 A | * | 4/1976 | Dryer ...................... 285/271 X |
| 4,035,004 A | | 7/1977 | Hengesbach |
| 4,356,998 A | * | 11/1982 | Bach et al. .............. 285/261 X |
| 4,596,362 A | | 6/1986 | Pralle et al. |
| 4,776,615 A | * | 10/1988 | Young ..................... 285/261 X |
| 5,288,110 A | * | 2/1994 | Allread .................... 285/263 X |
| 5,658,022 A | * | 8/1997 | Shi et al. ................. 285/261 X |
| 5,697,534 A | | 12/1997 | Huyghe |
| 5,730,370 A | | 3/1998 | Bowen |
| 5,975,490 A | * | 11/1999 | Essman ................... 285/261 X |
| 6,027,041 A | | 2/2000 | Evans |

FOREIGN PATENT DOCUMENTS

| | | |
|---|---|---|
| CH | 169623 | 9/1934 |
| DE | 3629696 A1 | 3/1988 |
| IT | 445789 | 9/1947 |

\* cited by examiner

*Primary Examiner*—Lynne H. Browne
*Assistant Examiner*—David Bochna
(74) *Attorney, Agent, or Firm*—Carella, Byrne, Bain, Cecchi, Stewart, et al.; John G. Gilfillan, III; William Squire

(57) ABSTRACT

A fluid coupling device employs a male spherical member with a fluid receiving bore and a female housing. The spherical member abuts two axially spaced Teflon ring seats between the member and the housing in the housing chamber. The ring seats reduce friction between the member and the housing, and axially retain the member in the housing with no metal to metal contact. A first O-ring provides fluid sealing between the spherical member and housing inner wall in the chamber. A hose receiving nipple member with a fluid receiving bore has a threaded concave end with a peripheral region that engages the first O-ring to hold the O-ring against the spherical member, one of the ring seats and housing chamber wall to seal the interface between the spherical member and housing. The nipple member has a flange which abuts the housing to limit squeezing action on the O-ring to ensure sufficient contact of the O-ring and mating surfaces to obtain a good seal without creating excessive friction loads. A second O-ring seals the interface between the flange and housing.

11 Claims, 1 Drawing Sheet

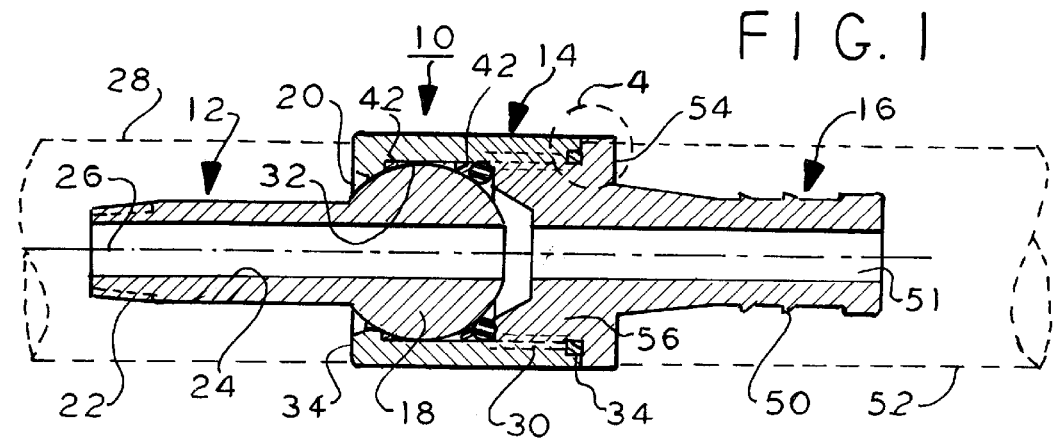
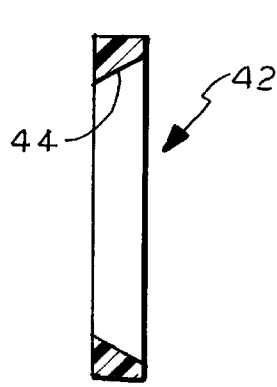
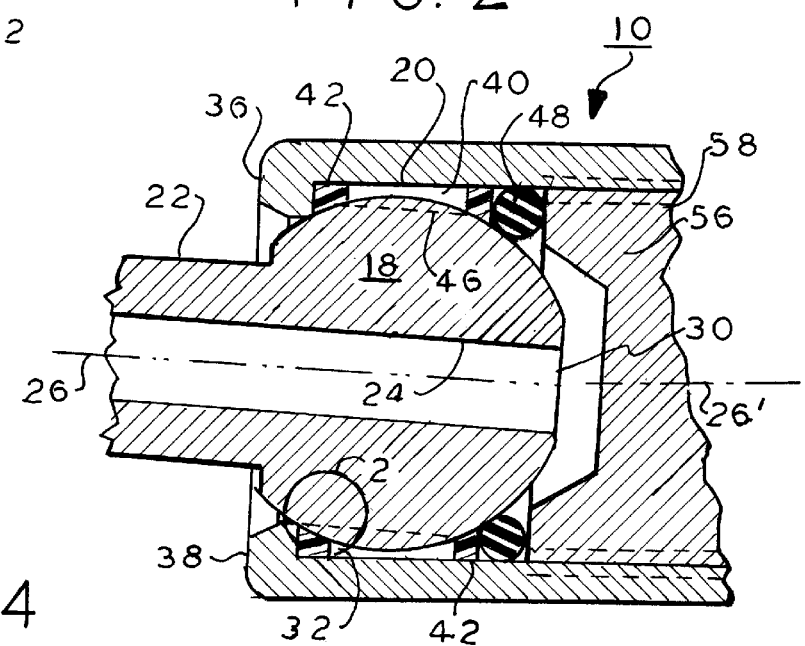
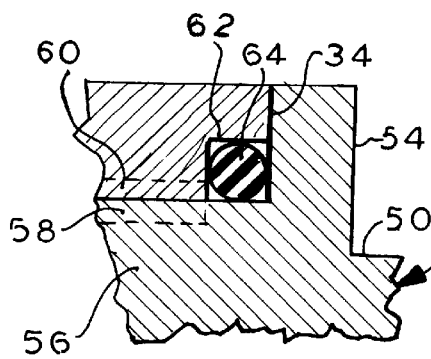
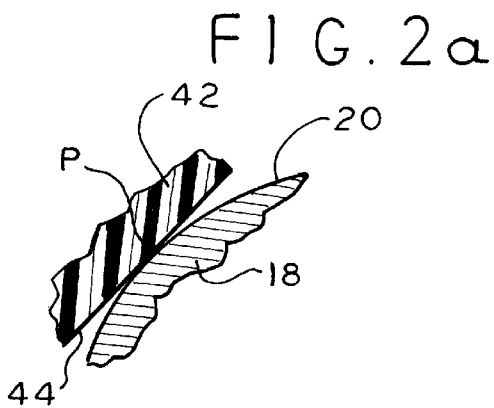

FLUID COUPLING DEVICE

This invention relates to fluid ball and socket couplings for connecting high pressure fluid hoses or for connecting a fluid supply high pressure hose to a spray nozzle.

U.S. Pat. No. 1,087,006 discloses a spray nozzle coupled to a hose with a ball and socket coupling comprising a metal ball connected in a metal socket that is spun about the ball to retain the socket on the ball. This arrangement is subject to leakage.

U.S. Pat. No. 2,557,106 discloses a similar device which suffers from a similar deficiency.

U.S. Pat. No. 2,971,701 discloses a ball and socket arrangement employing an O-ring in combination with a split ring. A coupling nut engages the ball. The split ring permits universal pivoting of the ball. In a further embodiment resilient fingers engage the ball to s bias the ball toward the split ring. In other embodiments a spring biases the ball.

In U.S. Pat. No. 3,022,014 a ball and socket arrangement is shown for a shower head. The ball is seated at one region against a packing and at another region is retained by a nut that has a shoulder that engages the ball.

U.S. Pat. No. 3,224,793 shows a ball and socket arrangement wherein an O-ring is used in combination with a split ring, the ring for retaining the ball in the socket.

In U.S. Pat. No. 3,334,818 to Moen, a swivel and socket arrangement is shown in which an adapter is threaded to a mounting member forming a socket. An O-ring seals against the swivel and against the adapter and mounting member. The adapter squeezes against the O-ring. An undescribed member also abuts the ball distal the adapter apparently for retaining the swivel in the socket in one axial direction. It appears that the O-ring holds the swivel axially in place so the swivel will not displace toward the adapter away from the retaining member in the opposite axial direction. This function, however, is not expressly described per se. The end of the swivel, which is ball shaped, adjacent to the adapter, is spaced from the adapter. It thus appears that the O-ring is both a seal and a retainer member.

In U.S. Pat. No 3,921,912 a spherical member and gudgeon arrangement for a lawn sprinkler is disclosed. An O-ring abuts the member in the socket of the gudgeon and the spherical member also abuts the socket of the gudgeon directly.

Metal to metal contact in certain of the above patent devices is undesirable as it causes galling. Galling creates metal chips which can harm the O-rings which are typically rubber and thus cause leakage. In others of the above patents, the O-ring serves as both a sealing member and a retaining member. Since O-rings are typically made of rubber or other elastomeric material, high pressure between the O-ring and the mating members creates relatively high friction. This friction interferes with the operation of such devices. In some cases, it is known that silicon grease may be used on the O-rings to reduce friction. However, eventually such grease dissipates, especially in the presence of hot fluids, and the high friction returns.

The present invention is directed to provide a solution to the above problems. A fluid coupling device according to the present invention comprises a male member with a spherical surface and a fluid receiving bore passing through the member in communication with opposing first and second ends of the member. A first means is arranged for fluid coupling the first end of the male member bore to a fluid receiving device. A housing has a chamber lying on an axis and has a first transverse dimension open at a third end and a fourth end with a reduced transverse dimension opening. The second male member end and at least a portion of said male member spherical surface are received in said chamber, said reduced dimension fourth end for retaining the male member in the chamber in a first direction along the axis.

A nipple member is included and comprises a nipple at one end and a coupling member at an opposing end, the nipple for receiving and coupling to a fluid source for supplying fluid to said male member fluid receiving bore, the coupling member and housing including mating means for axially attaching the nipple member to the housing for retaining the male member in the chamber in a second direction opposite the first direction.

First and second annular seat members are included and exhibit negligible friction on their surfaces, the seat members being located in the chamber in spaced axial relation along the axis and abutting the housing on an outer peripheral surface of the seat members, the seat members abutting the spherical surface in the spaced axial relation and arranged for receiving radial forces and axial forces from the spherical surface in respective opposing axial directions. Second means fluid seal the chamber between the housing and male member and the housing and nipple member.

The seat members preferably comprise polytetraflouride material at at least at the interface with the spherical member.

In one embodiment, the housing chamber is circular cylindrical, the seat members comprising circular rings.

In a further embodiment, the seat members each have inner inclined surfaces which contact the spherical surface of the male member.

IN THE DRAWING

FIG. 1 is a sectional elevation view of a ball and socket coupling arrangement according to an embodiment of the present invention;

FIG. 2 is a more detailed sectional elevation view of a portion of FIG. 1;

FIG. 2a is a more detailed view of the region 2 in FIG. 2;

FIG. 3 is a side elevation fragmented sectional view of a representative seat used in the embodiment of FIG. 1; and FIG. 4 is a fragmented portion of the device of FIG. 1 taken at region 4.

In FIG. 1 coupling device 10 comprises a male member 12 and a female housing 14. A nipple member 16 is connected to the housing 14. The male member 12 includes a ball portion 18 having a spherical surface 20. A tubular member 22 extends from the portion 18 and is one piece integral therewith. All of the elements above are steel and preferably stainless steel. The male member 12 has a bore 24 and has an axis 26. The tubular member 22 may be coupled to a flexible hose or to a spray gun via a mating coupling 28 (shown in phantom). The member 12 has an end 30 at the bore 24.

The housing 14, FIG. 2, is preferably circular cylindrical with a circular cylindrical chamber 32. The housing 14 has one end 34 that is open to the chamber (FIG. 1). The housing 14 has a second end 36 with a radially inwardly extending flange 38 that has a reduced diameter as compared to the opening at end 34. Flange 38 is smaller than the diameter of the spherical surface 20 of the ball portion 18. The chamber 32 has a diameter that is larger than the diameter of the ball portion 18 spherical surface so that the surface 20 is spaced from the inner surface of the housing in the chamber 32 forming gap 40. The spherical surface 20 does not contact the housing at any point thereof so that there is no metal-to-metal contact therebetween. This prevents possible galling that may eventually occur between two metal surfaces that contact each other and move relative to each other. Such galling would produce undesirable metal chips or fragments that could otherwise deteriorate the seals of the device to be described below.

Located in the chamber 32 are two preferably like Teflon (polytetrafloroethylene) ring seats 42. As known, this material is commercially available and exhibits very low friction. Representative seat 42, FIG. 3 has an inclined inner bearing surface 44. This surface engages the outer spherical surface 20 of the male member 12. The inclined surface 44 is flat and thus makes point contact with surface 20, FIG. 2a at tangential point P. This produces a line contact between the seats 42 and the spherical surface 20, minimizing friction therebetween. While the seats are preferably solid Teflon, they may also be fabricated of other material and provided with a Teflon coating forming the bearing surfaces 44 engaging the spherical surface 20. Other materials of low friction may be used in the alternative.

The two seats 42 make line contact with the surface 20 at the ends of chord 46, FIG. 2, of the spherical surface 20. Chord 46 is parallel to the chamber 32 axis 26' which is coaxial with axis 26. The two inclined surfaces 44 of the two seats 42 face in opposing directions and provide low friction contact with the spherical surface in two opposing directions. Thus the seats 42 apply axial thrust forces to the surface 20 in opposite directions retaining the spherical ball portion 18 in the axial direction, axes 26, 26' in response to fluid forces on the male member 12. This permits the surface 20 to rotate with a minimum of friction and no galling.

An O-ring 48, rubber, plastic or elastomeric material is in the chamber 52 abutting the housing 14 inner chamber wall, the spherical surface of portion 18, and the next adjacent ring seat 42, FIG. 2. The O-ring 48 seals the interface between the housing and the spherical surface 20 of the ball portion 18.

Nipple member 16 has a serrated nipple 50, FIG. 1, for insertion into the bore of a flexible hose 52. The member 16 has a bore 51 and an enlarged circular cylindrical flange 54 and a cylindrical end member 56 of larger diameter than the nipple 50 at one end of the member 16. The end member 56 has external threads 58, FIG. 4, that engage internal threads 60 of the housing 14. The housing 14 has a corner recess 62. An O-ring 64 is in the recess 62. Flange 54 of the nipple member 16 abuts the end 34 of the housing and the O-ring 64 fluid sealing the interface between the nipple member 16 and housing 14. The abutment of the flange 54 with the housing end 34 limits the amount that the O-ring 48 is deformed by the member 16. This deformation is enough to provide a good seal between the O-ring and the housing and surface 20 without exerting excessive friction load on the spherical surface to maximize life of the O-ring. The primary force loads of the portion 18 on the housing are borne by the ring seats 42. The O-ring 48 does absorb some axial loads from the abutting seat 42 but these loads have no significant effect on the low friction between the seat and the surface 20. The end surface of the nipple member 16 end member 56 is concave and does not contact the spherical surface 20.

It will occur to one of ordinary skill that modifications may be made to the disclosed embodiments without departing from the scope of the invention as defined in the appended claims. The disclosed embodiments are given by way of illustration and not limitation.

What is claimed is:

1. A fluid coupling device comprising:
   a male member with a first portion having a spherical surface and an extension member extending from the first portion, the male member having a fluid receiving bore passing through the first portion and the extension member in communication with opposing first and second ends of the member;

the extension member being arranged for fluid coupling the male member bore to a fluid receiving device;

a tubular housing wall having a circular cylindrical chamber defining a longitudinal axis, the chamber having a substantially uniform first transverse dimension, the chamber being open at a third end of the housing wall and partially enclosed at a fourth end of the housing wall by a transverse bottom wall having a second transverse dimension opening smaller than the first transverse dimension, said housing wall having an internal thread in said chamber terminating at an end edge of said housing wall at said fourth end, at least a portion of said male member spherical surface portion being received in said chamber, said reduced dimension second opening cooperating with said spherical surface portion for retaining the male member in the chamber in a first direction along the axis;

a nipple member including a nipple at one end and a coupling member at an opposing end, the nipple for receiving and coupling to a fluid source for supplying fluid to said male member fluid receiving bore, the coupling member including a radially outwardly extending flange for abutting the housing wall at the third end and including a cylindrical member extending from the outwardly extending flange, the cylindrical member having an external thread for engagement with the housing internal thread in the chamber for axially attaching the nipple member to the housing for retaining the male member in the chamber in a second direction opposite the first direction;

first and second annular seat members exhibiting negligible friction on their surfaces, the seat members being located in the chamber in spaced axial relation along the axis and abutting the housing wall in the chamber on an outer peripheral surface of the seat members, the seat members abutting the spherical surface in said spaced axial relation for spacing the housing wall in the chamber from the male member spherical surface; and a pliable seal device for fluid sealing the region in the chamber between the housing wall, the male member spherical surface, one of the seat members and the coupling member.

2. The device of claim 1 wherein the seat members comprise polytetrafluoroethylene material at least at the interface with the spherical member.

3. The device of claim 1 wherein the seat members comprising circular rings.

4. The device of claim 1 wherein the seat members are identical and are located at opposite ends of a chord of the spherical surface, the chord extending parallel to the axis.

5. The device of claim 1 wherein said seal device is an O-ring.

6. The device of claim 1 wherein the flange and coupling member of the nipple member have a junction therebetween, the housing has an annular recessed shoulder at the housing wall third end, further including an O-ring engaging said shoulder and said coupling member at said junction.

7. The device of claim 1 wherein the coupling member has a concave end surface spaced from the male member in said chamber and defining an annular peripheral rim, the seal device comprising an O-ring such that the coupling member forces the O-ring against the male member, against the first seat member and against the housing.

8. The device of claim 1 wherein the extension member comprises a tubular element for engagement with one of a hose and fluid spray nozzle.

9. The device of claim 1 wherein the seat members comprise polytetrafluoroethylene material.

10. The device of claim 1 wherein the seat members each have planar inner inclined surfaces which contact the spherical surface at a tangent thereto.

11. A fluid coupling device comprising:
- a male member with a spherical surface and a fluid receiving bore passing through the member in communication with opposing first and second ends of the member;
- the male member including an extension member arranged for fluid coupling the first end of the male member bore to a fluid receiving device;
- a housing having a tubular wall forming a circular cylindrical chamber lying on a longitudinal axis of the chamber and of a first transverse dimension open at a third end and partially enclosed at a fourth end with a reduced transverse dimension opening, said male member second end and at least a portion of said male member spherical surface being received in said chamber, said reduced dimension fourth end for retaining the male member in the chamber in a first direction along the axis, said housing wall at the third end being threaded in the chamber in communication with the third end;
- a nipple member including a nipple at one end and a coupling member at an opposing end and a radially outwardly extending flange between the nipple member and coupling member, the nipple for receiving and coupling to a fluid source for supplying fluid to said male member fluid receiving bore, the coupling member including outer threads for axially attaching the nipple member to the housing threads in the chamber for retaining the male member in the chamber in a second direction opposite the first direction, the flange for abutting the housing wall at the third end;
- first and second ring seat members exhibiting negligible friction on their surfaces, the seat members being located in the chamber in spaced mirror image axial relation along the axis and abutting the housing wall in the chamber on an outer peripheral surface of the seat members, the seat members each having an inner inclined planar surface abutting the spherical surface in said spaced axial relation in line contact and arranged for receiving radial forces and axial forces from the spherical surface in respective opposing axial directions; and
- an O-ring for fluid sealing the chamber in the interface between the housing, the male member spherical surface, one of the seat members and the nipple member wherein the O-ring seals the chamber at the third end in response to compressing the O-ring between the nipple member and one of said ring members.

* * * * *